April 23, 1946. E. GISONDI 2,398,784
FASTENING DEVICE
Filed Oct. 23, 1944
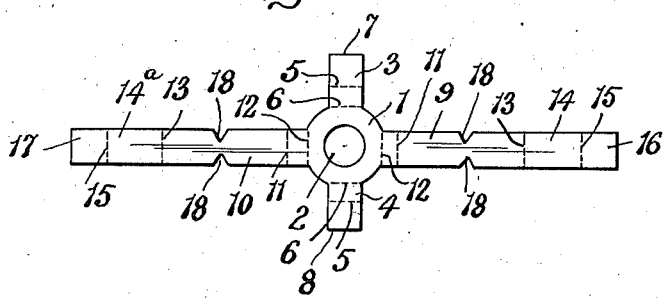
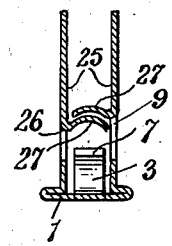
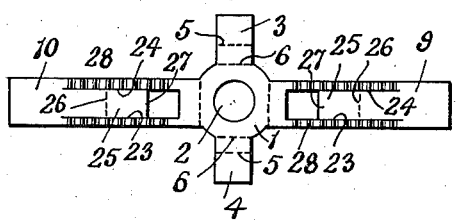
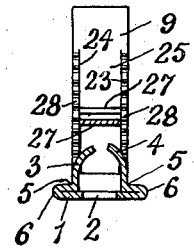
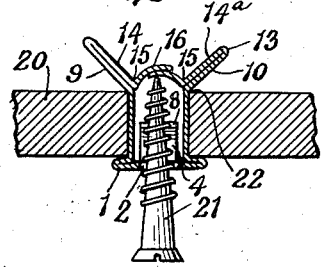
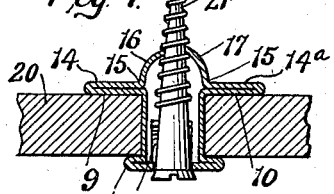
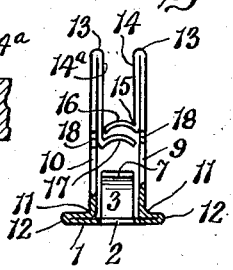
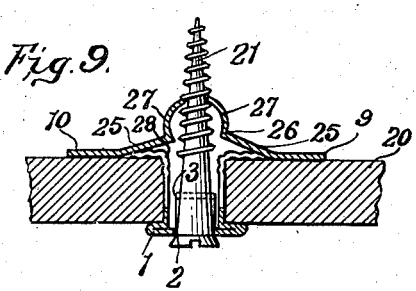
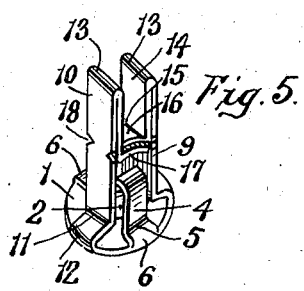
INVENTOR
Emanuel Gisondi
BY
Harry Radzinsky
ATTORNEY Patented Apr. 23, 1946

2,398,784

UNITED STATES PATENT OFFICE 2,398,784

FASTENING DEVICE

Emanuel Gisondi, Larchmont, N. Y.

Application October 23, 1944, Serial No. 559,945

13 Claims. (Cl. 85—5)

This invention relates to fasteners, and more particularly to those intended for securing articles or materials to walls or other surfaces composed of sheet material, and for securing several layers of sheet material together.

The invention contemplates the provision of a fastener, preferably made from sheet metal or the like, which is extended through a hole or opening in the sheet material and is adapted to have prongs or other suitably shaped parts bent over at the rear of the sheet material, the bending-over action being secured from the exposed or outer face of the wall and solely by the insertion and threading of a screw or other threaded element into the fastener.

An object of the invention is to provide a fastening means of this character which will accept wood screws as well as machine screws or other threaded elements; which is not critical as to the size of the screws employed; which is operated solely by the threaded insertion of the screw; which will securely hold the screw and itself in place and unite several layers of sheet material, and which can be speedily and inexpensively made from sheet metal.

These and other objects are accomplished by the invention, a more particular description of which will appear hereinafter and be set forth in the claims appended hereto.

In the accompanying drawing, in which several embodiments of the invention are shown, Fig. 1 is a face view of a blank from which the improved fastener is made; Fig. 2 is a side view of the fastener, with a portion of the same adjacent to the head of the device shown in section; Fig. 3 is a sectional view through the fastener, showing it in place in an aperture in sheet material and with the prongs being bent over by the pressure of a screw; Fig. 4 is a similar view, showing the screw fully inserted and the prongs being in the final position of bend, and disposed against the back face of the sheet material; Fig. 5 is a perspective view of the fastener; Fig. 6 is a face view of a blank from which another embodiment of the invention is made; Fig. 7 is a vertical sectional view through a fastener made from the blank of Fig. 6; Fig. 8 is a vertical sectional view through the fastener of Fig. 7, the view being taken at right angles to that of Fig. 7; and Fig. 9 is a sectional view showing the fastener of Figs. 7 and 8 in place.

The blank from which the fastener shown in Figs. 1 to 5 inclusive is made is shown in Fig. 1. It will be there noted that the same consists of an elongated section of resilient sheet metal, such as sheet steel, and is provided with a central, disk-like portion 1, which forms the head of the fastener, and which is provided with a central screw-hole 2, through which a screw 21 or other threaded member is adapted to pass. Extending radially from the head 1 is a pair of diametrically opposite, relatively short tongues 3 and 4, each of which is bent inwardly and thence upwardly on the fold lines 5 and 6 to thereby reinforce the head at the back and then extend rearwardly therefrom. These two tongues have their respective ends 7 and 8 curved inwardly or toward one another to engage with the thread on the screw 21 when the screw is inserted through the screw-hole 2.

Also extending radially from the head 1 is a pair of diametrically opposite lengthy tongues or strips 9 and 10 having their axis located at right angles to that of the tongues 3 and 4. Each of the long tongues or strips 9 and 10 is bent inwardly and then upwardly on the two fold lines 11 and 12 to reinforce the head and then provide a pair of relatively lengthy parallel prongs extending rearwardly from the back of the head, as clearly seen in Figs. 2 and 5. Each of the prongs so formed is transversely bent or doubled upon itself, as indicated at 13, to thus provide an outer or free-end portion of double thickness, the inner ply of which is indicated at 14 on the tongue 9, and at 14a on the tongue 10. These inner portions 14 and 14a are each bent on the line 15 thus providing the part 14 with an inwardly extending lug portion 16, and the part 14a with a similar lug portion 17.

It will be noted that these inturned lug portions 16 and 17 are curved or arched as clearly seen in Figs. 2, 3 and 4 and that they normally extend in a direction toward one another and overlap or overlie one another. They may be slightly spaced apart in such overlying relationship or they may be disposed in contact or in contiguous relation.

In placing the fastener in position, a hole or properly shaped aperture is provided in the sheet material, or through a number of layers of sheet material if it is intended that the fastener shall secure together a number of layers or plies. For simplicity in illustration a single thickness of sheet material is shown at 20.

The fastener is inserted through the hole in the sheet material until the head 1 of the fastener comes into contact with the face of the same. The prongs 9 and 10 are of such length relative to the thickness of the material through which they are to extend that when the fastener is inserted in position as above described, the portions of the prongs which are of double thickness will project rearwardly of the back of the sheet material 20. At this time, the prongs 9 and 10 are in a straight or unbent condition, as shown in Figs. 2 and 5. A wood-screw 21, a machine screw or other suitable threaded member, is now inserted through the screw hole 2 and when it enters the hole for a short distance its threaded shank will be engaged by the inturned short tongues 3 and 4, thus holding the screw in place and permitting its forward threading movement to be continued through the fastener. As the screw progresses through the fastener, its pointed end or tip will necessarily come into contact with the first of the lugs, indicated at 17, and as the screw exerts pressure on these overlying lugs 16 and 17, it will start to bend the prongs 9 and 10 outwardly or in a direction away from one another. This bending action occurs at the point of single thickness of each prong just where the prong emerges from the sheet material 20. To facilitate the outward bending of the prongs in the manner described, and at the proper point, or that indicated at 22 in Fig. 3, each of the prongs 9 and 10 may be suitably notched or otherwise weakened as indicated at 18.

As further inward threading movement of the screw is continued, the screw forces the prongs over completely to a position against the rear of the sheet material 20 until the prongs are bent over firmly against the back of the same. At this time it will be observed that the lugs 16 and 17 have been spread apart or upset to such an extent that their extreme ends or tips are now in resilient engagement against the threaded portion of the screw. These lugs thus exert resilient pressure on the screw and anchor it firmly and prevent it from unthreading or shifting longitudinally so that it may be used for fastening any article or material to the exposed face of the material 20 in which the fastener is now securely anchored.

Since the sheet material 20 is now firmly confined between the head 1 and the bent over portions of the prongs 9 and 10, the fastener not only serves as an anchorage for a screw or other threaded member, but also serves to hold several layers of the sheet material together, if the material 20 be in several layers.

In the embodiment of the invention disclosed in Figs. 6 to 9 inclusive, the fastener is formed from the blank of Fig. 6. This blank has the central disk-portion or head 1 as described in respect to the device of Fig. 1 and also has the short tongues 3 and 4 constructed as previously set forth. The tongues 9 and 10 of this embodiment, are each slit lengthwisely on parallel lines, as indicated at 23 and 24, to provide a tongue 25 between them. Each tongue 25 has a free end 27 which is transversely bent at 26 so that when the two tongues 9 and 10 constituting prongs of the fastener are extended rearwardly and located in spaced, parallel relation, the parts 27 will constitute lugs similar to those shown in Figs. 2 and 5 and indicated therein at 16 and 17. In Fig. 9, the fastener formed from the blank of Fig. 6, is shown in operative position, wherein it will be seen that the two prongs 9 and 10 have bent over in the manner similar to the prongs 9 and 10 of the first embodiment of the invention. It will be also noted that the tongue portions 25 spring out of the plane of the prongs 9 and 10 and engage the screw 21 with considerable resilience thus very firmly engaging the screw. To facilitate bending of the prongs 9 and 10 of this embodiment, the parts of the prongs located along the longitudinal edges of the tongue portions 25 may be corrugated as shown at 28.

While I have shown several embodiments of the invention, it is obvious that the same may be modified in many particulars to suit different requirements. In any case, the installation is simple since the device is simply thrust through an aperture in the material in which it is to be held; the screw is inserted and engaged with the tongues 3 and 4 to engage the thread of the screw; threading of the screw is continued to the extent required, such threading movement serving to bend over the prongs of the fastener at the back of the material through which it is extended. The screw may be withdrawn whenever desired, but it will not loosen inadvertently since it is securely and resiliently engaged by the tongues 3 and 4 and the lugs 16 and 17. Since the lugs and tongues are resilient, several sizes of screw may be accommodated, thus enabling the device to be put to many uses with standard types of screws or other threaded members.

What I claim is:

1. A fastener of the character described comprising, a sheet metal member provided with a head, a pair of prongs extending rearwardly and in spaced relation from the head, each prong having an inturned portion located inwardly from its end, the inturned portion on one prong lying in overlapping relation to the inturned part on the other prong at a point remote from the ends of the prongs, the head having an opening through which a threaded member is extended to cause the end of the same to exert pressure upon the inturned, overlapped parts of the prongs at points remote from the ends of the prongs and cause said prongs to bend outwardly and away from one another.

2. A fastener of the character described comprising, a head, integral prongs extending at substantially right angles to the plane of the head, each prong having an inturned lug located between the end of the prong and the head, the lug on one prong overlying the lug on the other prong, the head having an opening for receiving a threaded member, means extending from the head for frictional engagement against the threaded member, said threaded member when passed through the opening in the head exerting pressure on the overlying lugs at points inwardly of the ends of the prongs to spread said lugs apart to enable the threaded member to pass between them, such spreading movement of the lugs causing the prongs to be bent outwardly and away from one another.

3. A fastener of the character described comprising, a head, a pair of spaced parallel prongs extending rearwardly of the head, each prong having an inturned lug located inwardly from its end, said lugs being disposed in overlapped relation, the head having a screw-hole for the passage of a screw which, when extended through the screw-hole, will separate the lugs and cause the prongs to bend over, and inturned tongues extending from the head and located between the prongs for engagement with the shank of the screw.

4. A fastener of the character described comprising, a sheet-metal head having a plurality of prongs extending rearwardly from it, the head having a screw-hole through which a screw is passed to extend between the prongs, at least two of the prongs each having a curved inturned lug located inwardly from its end, the lug on one prong overlapping that on the other prong, the two overlapped lugs bridging the space between the two prongs on which they are provided at points remote from the ends of said prongs, whereby a screw, when passed through the screw-hole, will spread the lugs apart and cause the prongs on which said lugs are provided to bend over.

5. A fastener of the character described comprising, a head, a pair of prongs extending rearwardly therefrom, each prong having a lug portion inwardly of its free end, the lug portions being overlapped between the prongs and away from the ends thereof, the head having a hole through which a threaded member is passed to engage against the overlapped lugs to pass between the same and cause the prongs on which they are formed to become bent over at points between the lugs and the head and behind the material through which the fastener is inserted.

6. A fastener of the character described, comprising, a disk-like head provided with a screw-hole, at least two prongs formed integrally with the head and bent to extend rearwardly of the same, said prongs extending normally in parallel relation, each prong being provided with an inbent portion directed toward its companion prong, said inbent portions constituting lugs disposed in overlapped relation and located inwardly from the free end of each of the prongs and bridging the space between the prongs at points between the ends of the prongs and the head and located in the path of a screw passed through the screw-hole in the head, whereby said screw will contact said lug portions before said screw reaches the ends of the prongs and force them apart and cause the prongs to separate and become bent over at the back of the material through which the fastener is inserted.

7. A fastener of the character described in claim 6, wherein the prongs are provided with weakened bending points to determine the point on which each prong will bend when the screws exert pressure against the lug portions on said prongs.

8. A fastener of the character described comprising, a sheet-metal member having a central disk-like head, a pair of prongs integral with said head and extending rearwardly therefrom, each prong being transversely folded upon itself to form a part of double thickness on the prong, a portion of the prong being inturned to form a lug extending in a direction toward its companion prong, the lugs on the two prongs being overlapped between the prongs, the head having a screw-hole for receiving a screw which, when extended through the screw-hole, will engage against the lugs and force them apart and cause the prongs to be bent over at points where the prongs are of single thickness.

9. A fastener of the character described in claim 8, wherein the prongs are provided with weakened bending points in said single-thickness areas.

10. A fastener of the character described comprising, a sheet-metal member having a head, a pair of integral prongs extending rearwardly of the head, each prong being longitudinally slit and apertured to produce a struck-out spring portion in each tongue, each spring portion having an inbent free end, the inbent free end on one spring portion overlying that on the other spring portion, the head having a screw-hole for receiving a screw which, when extended through the screw-hole will engage the inbent ends and force the prongs apart and cause them to become bent over.

11. A fastener of the character described in claim 10, wherein the head is provided with a pair of inbent short tongues located between the prongs and having their ends operative against the shank of the screw.

12. A fastener of the character described in claim 10, wherein portions of the prongs along the side edges of the spring portions thereof are corrugated to aid in causing the prongs to bend at selected points under the pressure imposed by the screw.

13. A fastener having a head formed with a pair of rearwardly extending prongs located in spaced relation, each prong having a laterally extending lug located between its free end and the head and extending in a direction toward the other prong, whereby said lugs lie in overlapped position between the two prongs between the head and ends of the prongs, the head having a screw hole located between the prongs so that a screw passed through said hole will contact the overlapped lugs and force them apart sufficiently to pass between them, said screw when forcing the lugs apart acting to cause outward bending separation of the prongs at points remote from the free ends of said prongs.

EMANUEL GISONDI.